US011573946B2

(12) United States Patent
Kumar et al.

(10) Patent No.: US 11,573,946 B2
(45) Date of Patent: Feb. 7, 2023

(54) MANAGEMENT OF MEMORY USAGE USING USAGE ANALYTICS

(71) Applicant: INTERNATIONAL BUSINESS MACHINES CORPORATION, Armonk, NY (US)

(72) Inventors: Avinesh Kumar, Police Station-Dumra (IN); Sandeep R. Patil, Pune (IN); Gandhi Sivakumar, Bentleigh (AU); Matthew A. Terry, Celebration, FL (US); Matthew B. Trevathan, Roswell, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 96 days.

(21) Appl. No.: 16/876,285

(22) Filed: May 18, 2020

(65) Prior Publication Data

US 2020/0278956 A1 Sep. 3, 2020

Related U.S. Application Data

(63) Continuation of application No. 15/704,491, filed on Sep. 14, 2017, now Pat. No. 10,698,875, which is a
(Continued)

(51) Int. Cl.
*G06F 16/22* (2019.01)
*G06F 16/23* (2019.01)

(52) U.S. Cl.
CPC ......... *G06F 16/2282* (2019.01); *G06F 16/23* (2019.01)

(58) Field of Classification Search
CPC .... G06F 16/2282; G06F 16/23; G06F 16/256; G06F 16/258
(Continued)

(56) References Cited

U.S. PATENT DOCUMENTS

| 5,548,751 A | 8/1996 | Ryu et al. |
| 7,082,435 B1* | 7/2006 | Guzman ............... G06F 16/284 |
| | | 707/999.102 |

(Continued)

FOREIGN PATENT DOCUMENTS

| CN | 1361890 | 7/2002 |
| WO | 2009005492 | 1/2009 |

OTHER PUBLICATIONS

If Houses Grew Like Hard Devices, The Energy Zarr Blog, Jun. 8, 2008, http:/fenergyzarr.typepad.com/energyzarrnationalcom/metrics, 2 pages, Jun. 8, 2008.
(Continued)

*Primary Examiner* — Sheree N Brown
(74) *Attorney, Agent, or Firm* — Randy Emilio Tejeda; Andrew M. Calderon; Calderon Safran & Cole, P.C.

(57) ABSTRACT

An approach for managing memory usage in cloud and traditional environments using usage analytics is disclosed. The approach may be implemented in a computer infrastructure including a combination of hardware and software. The approach includes determining that space is available within one or more tables which have schema definitions with string fields having a predefined length. The approach further includes creating a virtual table and mapping the available space to the virtual table for population by one or more records.

15 Claims, 8 Drawing Sheets

Related U.S. Application Data continuation of application No. 15/091,701, filed on Apr. 6, 2016, now Pat. No. 9,830,347, which is a continuation of application No. 13/664,756, filed on Oct. 31, 2012, now Pat. No. 9,342,547.

(58) Field of Classification Search
USPC .......................................................... 707/736
See application file for complete search history.

(56) References Cited

U.S. PATENT DOCUMENTS

| | | | |
|---|---|---|---|
| 7,216,092 B1 | 5/2007 | Weber et al. | |
| 7,769,778 B2* | 8/2010 | Snapp | G06F 16/284 |
| | | | 707/999.005 |
| 7,870,164 B2 | 1/2011 | Miller et al. | |
| 7,913,184 B1* | 3/2011 | Zhang | G06F 40/174 |
| | | | 715/224 |
| 8,831,409 B1 | 9/2014 | Chang et al. | |
| 8,996,787 B2* | 3/2015 | Kettner | G06F 3/061 |
| | | | 710/68 |
| 9,497,136 B1* | 11/2016 | Ramarao | H04L 41/5009 |
| 2004/0117408 A1 | 6/2004 | Bharadwaj et al. | |
| 2005/0086195 A1 | 4/2005 | Tan et al. | |
| 2005/0289174 A1* | 12/2005 | Kolli | G06F 16/256 |
| | | | 707/999.102 |
| 2010/0306182 A1 | 12/2010 | Seager et al. | |
| 2013/0205067 A1* | 8/2013 | Kettner | G06F 3/0638 |
| | | | 711/E12.008 |
| 2013/0205068 A1* | 8/2013 | Kettner | G06F 12/0246 |
| | | | 711/E12.008 |
| 2013/0205110 A1* | 8/2013 | Kettner | H03M 7/6064 |
| | | | 711/170 |

OTHER PUBLICATIONS

An excellent article on using Oracle with twin provisioning, StorageRap, http://www.storagerap.com/2009/04/an-excellent-article-on-using-oracle . . . , 3 pages, Apr. 24, 2009.

J_ Koopmann, "Priming Oracle Data Files before Migrating to Thinly Provisioned Storage", http://hpstorage.dcig.com/2009/04/priming-oracle-data-files-befo.html, 3 pages, Apr. 24, 2009.

Anonymous "Alter Tablespace", Oracle database SQL Language Reference, 21 pages, Jun. 6, 2012.

Anonymous "Alter Database",Oracle database SQL Language Reference, 56 pages, Jun. 6, 2012.

* cited by examiner

MANAGEMENT OF MEMORY USAGE USING USAGE ANALYTICS

TECHNICAL FIELD

The present invention generally relates to computing systems and, more particularly, to methods and systems for managing memory usage in cloud and traditional environments using usage analytics.

BACKGROUND

Database schemas are designed in such a way that fields have sufficient space to store the data. However, for most number of instances, the spaces for storing these fields are more than actually used. This, of course, leads to wasted space and resources.

For example, consider a typical database schema for storing customer's address information, as follows:

Table CustmerAddress {
   Addrline1 varchar(255),
   AddrLine2 varchar(255),
   City varchar(100),
   PinCode varchar(10),
   Country varchar(50),
};

With the above example, a computer database application can ask for a desired number of bytes from a Virtual Memory Manager (e.g., a component of the operating system) for storing a customer's address. However, in this example, only a few (if any) instances of the CustomerAddress Table would use all allocated space, specifically for fields Addrline1 and Addrline2. In such cases, resources are wasted due to the fact that all the allocated spaces for storing the customer's address are not used. These resources (space) can be better implemented to cater to other needs. Also, a considerable amount of energy (i.e., electricity) needs to be consumed to keep up those unused spaces in memory or on external storage devices, as described herein.

A key features of a cloud based paradigm is efficient resource utilization (achieved through virtualization, for example). Many algorithms exist for effective memory allocation usage at a high level. However, there are gaps in the following dimensions:

A data block which is used statically by the process might have the following features: Table "customer" with first name as char 30, middle name as char 10, and last name as char 50. With lack of standards to define data lengths, the designer arbitrarily assigns data lengths and most of the times it is always higher to mitigate the associated risks. In reality the entire reserved space might not be used at all, thus wasting space and resources; and Commercially Off The Shelf products (COTS) have predefined data tables; ideally the subset domains and respective tables alone will be used. For example, a COTS application for inventory management will have appointment management functionality and related database tables which might not be used at all by the enterprise.

In all of the above cases, additional energy is used in maintaining the empty unused memory i.e., memory resources are not optimally utilized. In fact, it is known that a modern 1 terabyte drive consumes about 38 microwatts per megabyte. With this metric, 1 Byte would consume 0.036 nanowatt. In a large ecosystem involving multiple applications the percentage of unused memory is more which, in turn, results in the use of considerably more energy consumption.

SUMMARY

In a first aspect of the invention, a method is implemented in a computer infrastructure including a combination of hardware and software. The method comprises determining that space is available within one or more tables which have schema definitions with string fields having a predefined length. The method further comprises creating a virtual table and mapping the available space to the virtual table for population by one or more records.

In another aspect of the invention, a system is implemented in hardware and comprises a computer infrastructure operable to: track space within fields of one or more defined tables; create a tracker table of all available spaces within the one or more defined tables; create a virtual table; and map the available spaces to the virtual table.

In an additional aspect of the invention, a computer program product comprises a computer usable storage medium having readable program code embodied in the storage medium. The computer program product comprises at least one component operable to monitor space within fields of one or more tables having a schema definition with a first space allocation. The computer program product further comprises at least one component operable to determine that additional space is required within one or more of the fields. The computer program product further comprises at least one component operable to increment a value within the one or more fields to provide the additional space.

In a further aspect of the invention, a method comprises providing a computer infrastructure being operable to determine that space is available within one or more tables which have schema definitions with string fields having a predefined length. The computer infrastructure is further operable to map the available space to a virtual table for population by one or more records, and relinquish any space that was mapped to the virtual table for use within the one or more tables, as needed.

In another aspect of the invention, a computer system storage management comprises a CPU, a computer readable memory and a computer readable storage media. The system comprises first program instructions to determine that space is available within one or more tables which have schema definitions with string fields having a predefined length. The system comprises second program instructions to create a virtual table. The system comprises third program instructions to map the available space to a virtual table for population by one or more records. The system comprises fourth program instructions to relinquish any space that was mapped to the virtual table for use within the one or more tables, as needed. The first through fourth program instructions are stored on the computer readable storage media for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
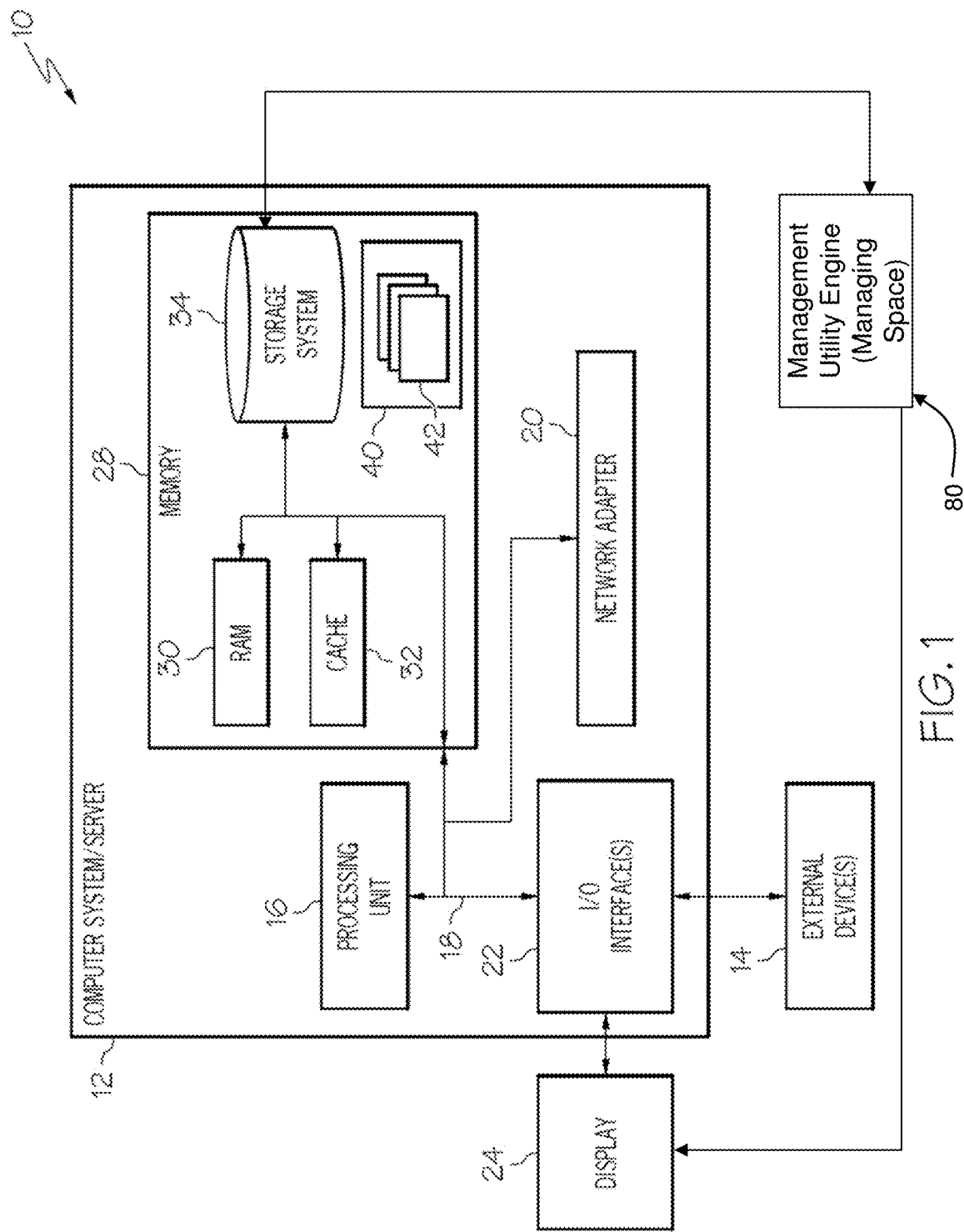
FIG. 1 depicts a cloud computing node according to an embodiment of the present invention.

The present invention generally relates to computing systems and, more particularly, to methods and systems for managing memory usage in cloud and traditional environments using usage analytics. In accordance with aspects of the invention, the methods and systems of the present invention are advantageously operable, structured and/or designed to effectively utilize space (e.g., memory) of allocated memory and/or external storage devices which, in turn, will allow for efficient management of power consumption. For example, by implementing the present invention it is now possible to use all available space within a defined schema, e.g., by creating a virtual table and mapping the available space to the virtual table.

In an example of use, a utility (e.g., storage management engine) is provided as part of a database system, to more efficiently and effectively manage used and unused space within the database. Illustratively, in embodiments, the utility manages space in the database system, where a database administrator defines schemas with string fields having a certain length, and which all of the allocated length (length as per the schema definition) is not used by each entry in the record. This can be implemented within a traditional or cloud based environment, based on a user's permission.

In more specific embodiments, the management of the space can be executed in such a way that all spaces, as per the schema definition, are provided at the usage end. This can be accomplished by assigning available space within the defined tables for use in a virtual table and, when needed again by the table, relinquishing such space within the virtual table. For example, the utility of the present invention can track available (e.g., unused) space within the database, and assign or map the available space to a virtual table. The available space can then be relinquished and used per the original schema definition, when needed, thus ensuring that all spaces, per the defined schema, can be used by the end user, e.g., the end user can use all or a portion of the character strings defined in the original schema definition. Accordingly, in implementation, as and when a user does not take up all of the space as per the permitted schema definition, the utility of the present invention will relinquish the space to a virtual table, for example, so that the space can be more efficiently used, and then when needed at a later time, relinquish this space from the virtual table back to the original table.

In embodiments, the utility of the present invention can be a component of database system. In this way, the database system administrator can take advantage of the utility for their chosen schemas, thereby acknowledging the management of space for the specific schemas. For the end user of the database, the usage of this functionality would be transparent. That is, the end user would still get the spaces available as per schema definitions; however, the utility would maintain track of actual usage of the spaces of managed schemas, and would make use of unused spaces to cater to other needs.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. FIG. 1 can also represent a computing infrastructure capable of performing and/or implementing tasks and/or functions of the methods described herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16. In embodiments, the computer system/server 12 comprises or communicates with a storage management engine 80 (also referred to as "Energy optimizer for memory" (EOFM)), as described in greater detail herein.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media. System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. For example, some or all of the functions of the storage management engine 80 may be implemented as one or more of the program modules 42. Additionally, the storage management engine 80 may be implemented as separate dedicated processors or a single or several processors to provide the functionality described herein. The storage management engine 80 can be implemented in a graphical user interface (GUI), e.g., display 24, which resides in any computing system such as that shown in FIG. 1, as an example. The display 24 can include a user interface such as a keyboard, mouse and/or touch screen.

In embodiments, the storage management engine 80 manages memory usage in cloud and traditional environments using usage analytics. In embodiments, the storage management engine 80 can reside in the storage system 34; for example, IBM® Blue Stack® (IBM and Blue Stack are trademarks of International Business Machines, in the U.S. and/or worldwide) or Independent Software Vendors (ISV) database servers. In implementation, the storage management engine 80 manages space in the storage system, where developers and/or administrators define schemas with string fields having a certain length, and which all of the allocated length (length as per the schema definition) is not used by each entry in the record. Alternatively, the storage management engine 80 can allocate additional space to the string fields, when necessary, as discussed in more detail herein.

In embodiments, the storage management engine 80 can manage the unused spaces based on a user's permission. This is accomplished, at least in part, by maintaining track of actual usage of the spaces of managed schemas. More specifically, in implementation, the storage management engine 80 includes an internal mapper, which maintains information about unused spaces, in extent based format, such as (starting location, length, etc.), and maps this information to a virtual table. In this way, the storage management engine 80 can make use of available space in a virtual table, in a dynamic manner. In further embodiments, the storage management engine 80 can create variable length character fields to more efficiently use the space within the defined schema.

Figure 5:
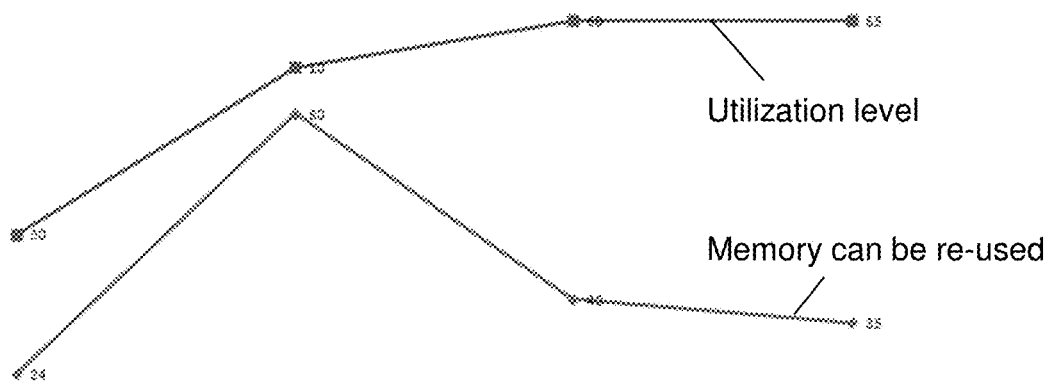
FIG. 5 shows a display of actual space and energy utilized against a period of time, in order to implement aspects of the present invention.
Figure 6:
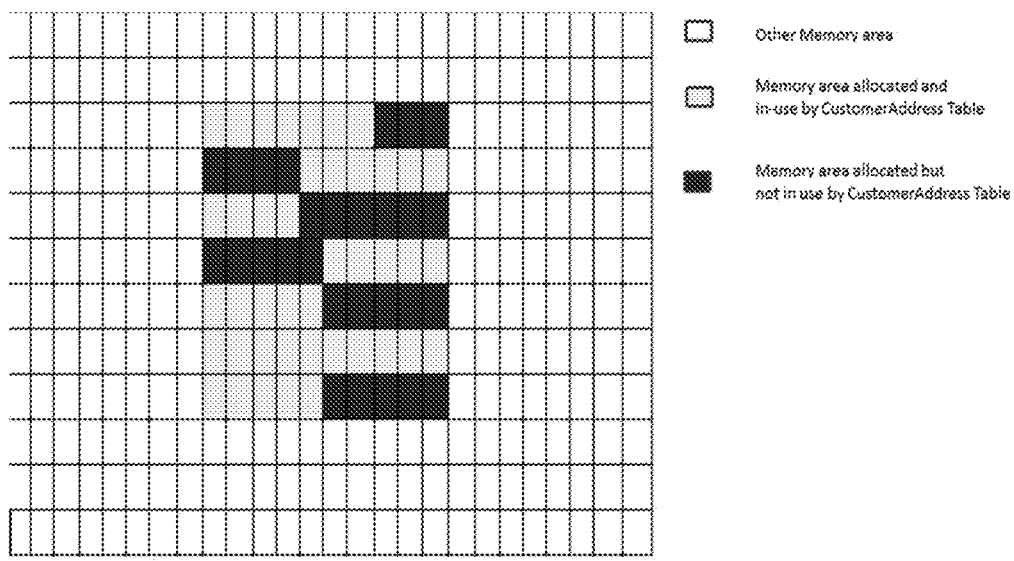
FIG. 6 shows a display of actual usage of memory versus reserved (and/or available) memory, in order to implement aspects of the present invention.

In more specific embodiments, the storage management engine 80 is operable, structured and/or designed to provide the following functionality:

Keep track of the actual used memory space against reserved space and, when required, allocate unused space to and from one or more virtual tables;

When triggered by the user, display actual space and energy utilized against the period of time (see, e.g., FIG. 5);

Allow the user to select the percentage of savings and internally leverage the unused space thus saving space and costs;

Allow a user to define which field and/or spaces within a particular field may or may not be given away to be utilized elsewhere; and Easily visualize actual versus reserved and/or unused memory (see, e.g., FIG. 6).

Accordingly, by implementing the storage management engine 80 of the present invention, it is now possible to overcome the basic problem of ineffective memory utilization and the associated energy spent in maintaining such unused memory and/or storage space. As to energy consumption, a considerable amount of energy (i.e., electricity) will be saved in that the storage system (e.g., database) no longer needs to be consumed to keep up those unused spaces in memory or on external storage devices.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID (redundant array of inexpensive disks or redundant array of independent disks) systems, tape drives, and data archival storage systems, etc.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
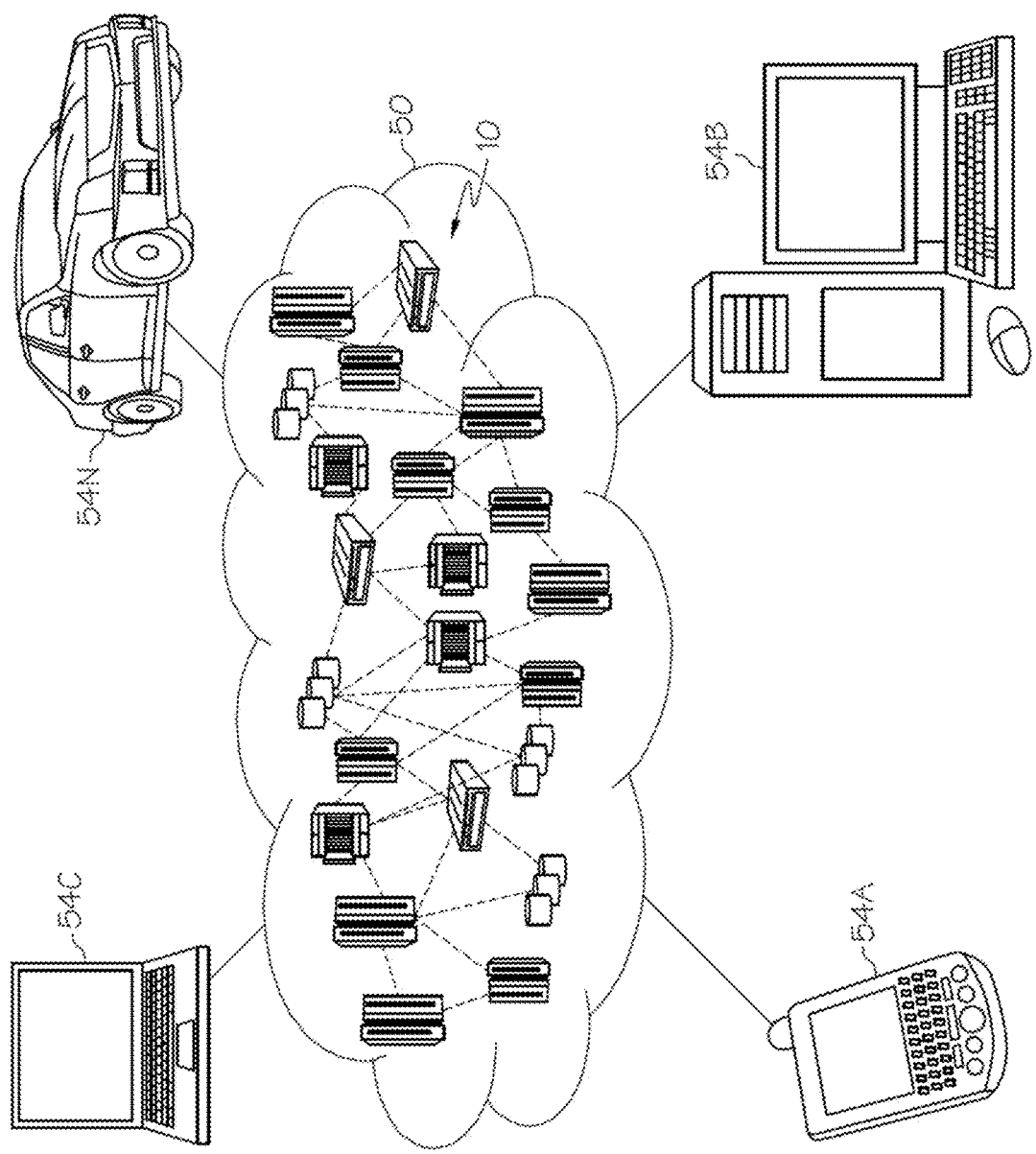
FIG. 2 depicts a cloud computing environment according to embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
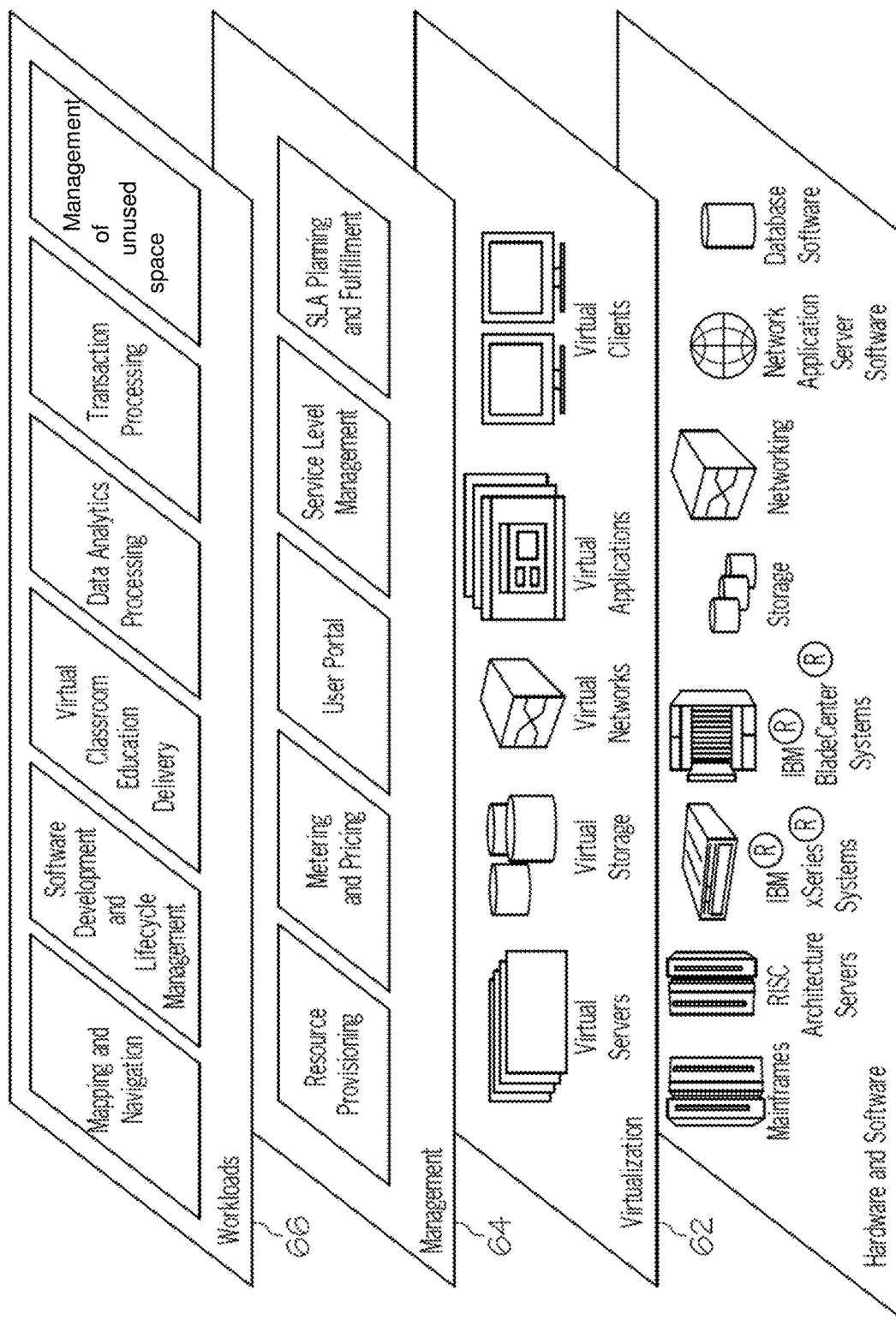
FIG. 3 depicts abstraction model layers according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided.

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and management of unused space. In accordance with aspects of the invention, the management of unused space workload/function operates to perform one or more of the processes described herein, including but not limited to:

Keep track of the actual used memory space against reserved and/or unused space and, when required, allocate unused space to and from one or more virtual tables;

When triggered by the user, display the actual space and energy utilized against the period of time;

Allow the user to select the percentage of savings and internally leverage the unused space thus saving space and costs;

Allow a user to define which field and/or spaces within a particular field may or may not be given away to be get utilized elsewhere; and Easily visualize actual versus reserved memory.

As will be appreciated by one skilled in the art, aspects of the present invention, including the storage management engine 80 and the functionality provided therein, may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Figure 4:
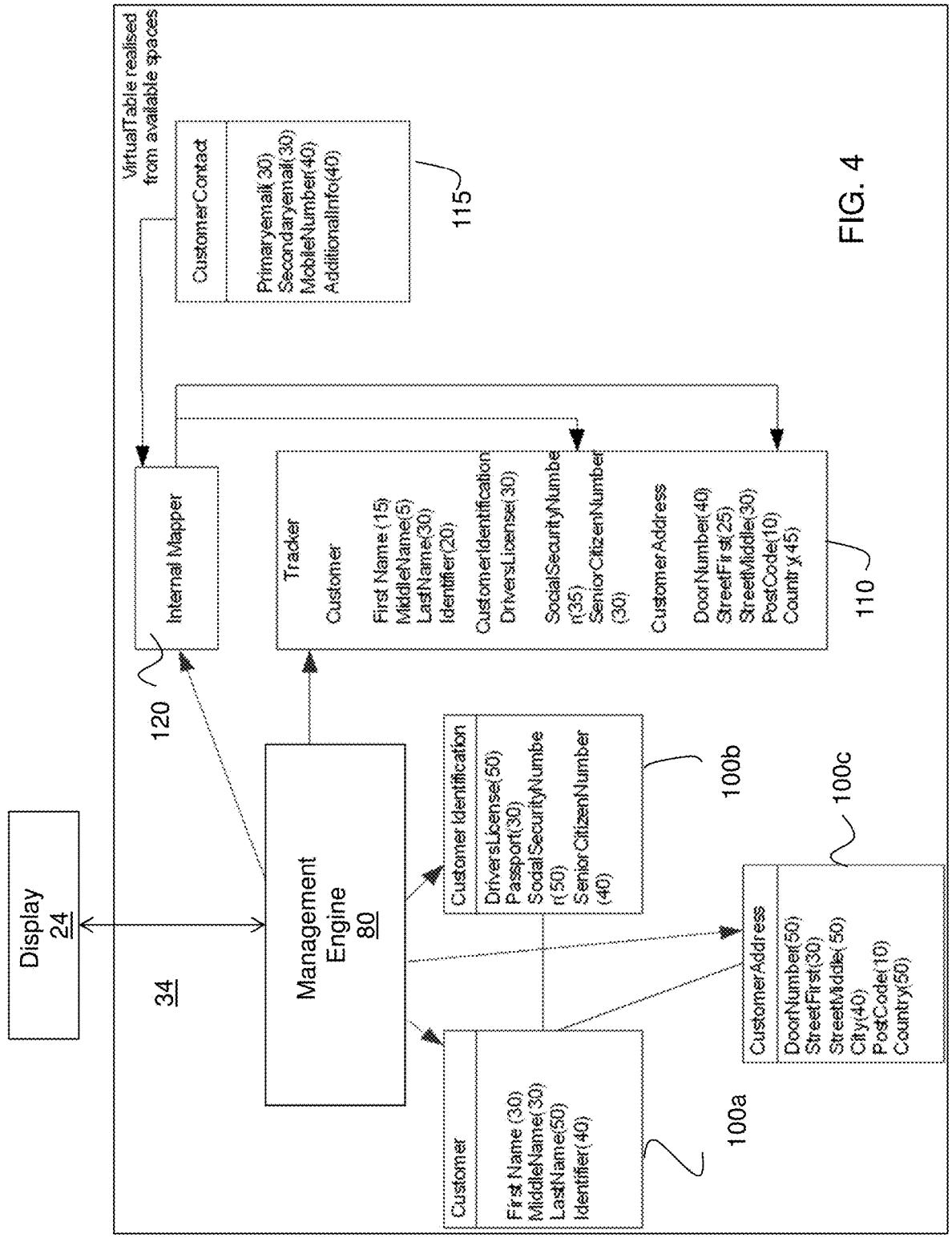
FIG. 4 shows a block diagram of implementations in accordance with aspects of the present invention.

FIG. 4 shows a block diagram implementing aspects of the present invention. Specifically, in FIG. 4, the storage management engine 80 is shown implemented in a storage system 34. The storage system 34 can be, for example, any database system. The functionality of the storage management engine 80 can be interfaced with a display device 24, which includes any type of user interface, e.g., keyboard, mouse and/or touch screen implementation.

In non-limiting exemplary embodiments, the storage management engine 80 will monitor tables 100a, 100b and 100c, which were created by a database manager or administrator. Although three tables are shown, it should be understood by those of skill in the art that the database can include any number of tables, with any number of fields of any number of character lengths, as defined by the database administrator for a particular database configuration. In embodiments, the table 100a defines fields for customer information, e.g., first name, middle name and last name, in addition to an identifier. In embodiments, each of the defined fields can contain a certain character length, as defined by the database manager. For example, in table 100a, first name=30, middle name=30, last name=50 and identifier=40. The table 100b defines fields for customer information, which includes, e.g., driver license=50, passport=30, social security number=50 and senior citizen number=40. The table 100c defines fields for customer address, which includes, e.g., door number=50, street first=30, street middle=50, city=40, postcode=10 and country=50.

As should be understood by those of skill in the art, each of the fields of each of the tables may be designed to provide ample space for data entry; however, it is very common that the database administrator provides more space than is typically required for each of these fields in order to mitigate risk. As such, it is common that the database will have available (e.g., unused) space, which can now be allocated to other needs, by implementing the present invention as further described below. Specifically, still referring to FIG. 4, the storage management engine 80 will create a tracker table 110 which will collect information from the tables 100a-100c (e.g., 100a-100n). More specifically, the tracker table 110 will keep track of all of the used (or unused) space, e.g., entered records, of tables 100a-100c, including the amount of characters used for each field. For example, in the illustration shown, the tracker table 110 notes the following space (e.g., character lengths) is available for customer information (table 100a): first name=15, middle name=5, last name=30 and identifier=20. Additional space is also shown to be available for tables 100b and 100c.

By a subtractive method, the storage management engine 80 will determine that there is unused space available for reallocation from the table 100a; that is, the following is used space, based on the original character lengths defined in table 100a: first name=15, middle name=25, last name=20 and identifier=20. In embodiments, the display 24 can visually represent the unused space versus reserved memory, as well as actual space and energy utilized against the period of time. (See, e.g., FIGS. 5 and 6.)

In embodiments, using the display and accompanying user interface, the user can now select certain options in order to manage the unused space of the tables 100a-100c. For example, the user can select an option to use a certain percentage of the unused space of the tables 100a-100c. In the illustrative example of FIG. 4, for example, based on the user selected option, the storage management engine 80 can create a virtual table 115, from the available space. To do this, an internal mapper 120 will map the unused spaces in the tables 100a-100c to the virtual table 115 (e.g., labeled Customer Contact). Thus, the virtual table 115 can be defined to include fields that are virtually mapped to available spaces within the tables 100a-100c. In embodiments, the internal mapper 120 can map the space required through split mechanisms, e.g., combine two available spaces to cater to one records need. As should be understood by those of skill in the art, the virtual tables can be created during off peak time per a schedule or when peak load is reduced, in order to more efficiently use power.

In further embodiments, the processes of the present invention can be automated through a dynamic grant process. In the dynamic grant process, a minimum value and an increment value can be configured, for certain fields of any of the tables 100a-100c. For example, for each field in a table, the administrator can set upper and lower bounds of size for the field, which allows the system to dynamically change the size of the field via a dynamic create/alter process. This allows the database administrator to initially create a field with a minimum length and increment the size of the fields based on the parameters defined by the database administrator (or developer). This type of process, e.g., algorithm, can be extended to become complex for allotment of memory and thus more power savings.

By way of non-limiting illustrative example:

```
CREATE TABLE CustomerAddress
(
DoorNumber varchar(255) lower (50) increment (25),
StreetFirst varchar(255) lower(30) increment (2),
StreetMiddle varchar(255) lower(50) increment(10),
City varchar(255) lower(40) increment(10),
PostCode( varchar10),
Country varchar (50)
)
```

In the above example, the DoorNumber would initially be created with a size of 50. When an insert request comes in for the doornumber field, the database can alter itself to increase the size of the field by 25 or it can create a temporary table called CustomerAddressTMP that allows it to have a temporary table with DoorNumber varchar(75) or DoorNumber(255). This will allow the database to either allocate a full field or the incremented field. The database can also merge the tables during off peak time per a schedule or when peak load is reduced. In embodiments, some fields may not be variable, e.g., PostCode and Country fields. Instead, these fields are a hard set and cannot be altered, as it may be advantageous to have a preset, immutable field length.

The dynamic grant process can also be implemented with the use of the virtual tables. For example, after incrementing a certain field, the tracker table can be used to determine if there is any available space, and the internal mapper 120 can map the available (e.g., unused) spaces within the defined schema to the virtual table. In this way, any unused space, as increased through the incremental processes of the present invention, can be used by allocating such spaces to the virtual table. This will minimize any energy consumption needed to maintain unused space.

Accordingly, in embodiments of the present invention, resource sharing can now be provided and/or leveraged by the cloud (through distributed and grid computing) to effectively and efficiently manage resource utilization. For example, using the processes of the present invention, it is now possible to allocate data spaces in a dynamic manner specified by the above processes. This, in turn, results in the proper utilization of memory and/or storage and the associated maintenance of power, as well as allowing alteration of off the shelf based products which are by default shipped with pre-defined database tables that are not efficiently managed and used, thereby impacting effective resource utilization and associated power.

FIG. 5 shows a display of actual space and energy utilized against a period of time. More specifically, FIG. 5 is representative of how utilization level value and memory can be re-used, and fluctuate over a time-line. It should be understood that the display of FIG. 5 can be used to allow the user to select the percentage of savings so that the systems and processes of the present invention can internally leverage the unused space thus saving space and costs. This display can also be used to determine when to merge tables during off peak time per a schedule or when peak load is reduced.

In one implementation, FIG. 5 can be representative of values against running time; memory required by defined tables, and how much was the utilization level. In embodiments, the utilization level would provide administrator information about how much percentage of unused memory is being utilized for other needs. As an example, 0% Utilization Level can refer to the EOFM basically being disabled and 100% means all unused memory is being utilized by the present invention. In embodiments, the EOFM would collect data about various values of memory (as mentioned below) from the internal tracker. For example, the following information can be tracked:

(i) memory required by defined tables;

(ii) memory actually getting utilized by EOFM to cater to other needs; and (iii) memory which is still available to be reused somewhere else.

In embodiments, the graphical user interface (GUI), e.g., display 24, of the present invention can be used by a user to can change the utilization level (e.g., from 0%-100%), where 0 indicates that unused memory is not to be used for virtual tables and 100 indicates that all the unused memory can be used from the defined tables. Thus, it is possible that an administrator can set the memory utilization level for the EOFM, in accordance with aspects of the present invention.

FIG. 6 shows a display of actual usage of memory versus reserved memory (memory which can be allocated to the virtual table as shown, for example, in FIG. 4). It should be understood by those of skill in the art that the display of FIG. 6 can be used to allow the user to select a percentage or specific unused allocated areas which should and should not be mapped to the virtual table. This display can also be used to determine when to merge tables during off peak time per a schedule or when peak load is reduced.

More specifically, in FIG. 6, the non-shaded areas represent memory areas which may be allocated to any number of tables and/or functions. On the other hand, the lightly shaded areas represent memory areas allocated to a specific table, e.g., customer address table shown in FIG. 4, and which are in use; whereas, the darkly shaded areas represent memory areas allocated to a specific table, e.g., customer address table shown in FIG. 4, and which are not in use. In embodiments, these unused allocated areas can represent entire unused fields or a number of characters within the field that are not in use, and which can now be allocated and mapped by the storage management engine to a virtual table. In this way, the unused allocated areas can now be managed and efficiently used by the systems and processes of the present invention. This table can also be used to increment the values, when it is determined that additional space is needed within a particular field of a particular table or tables.

Flow Diagrams

Figure 7:
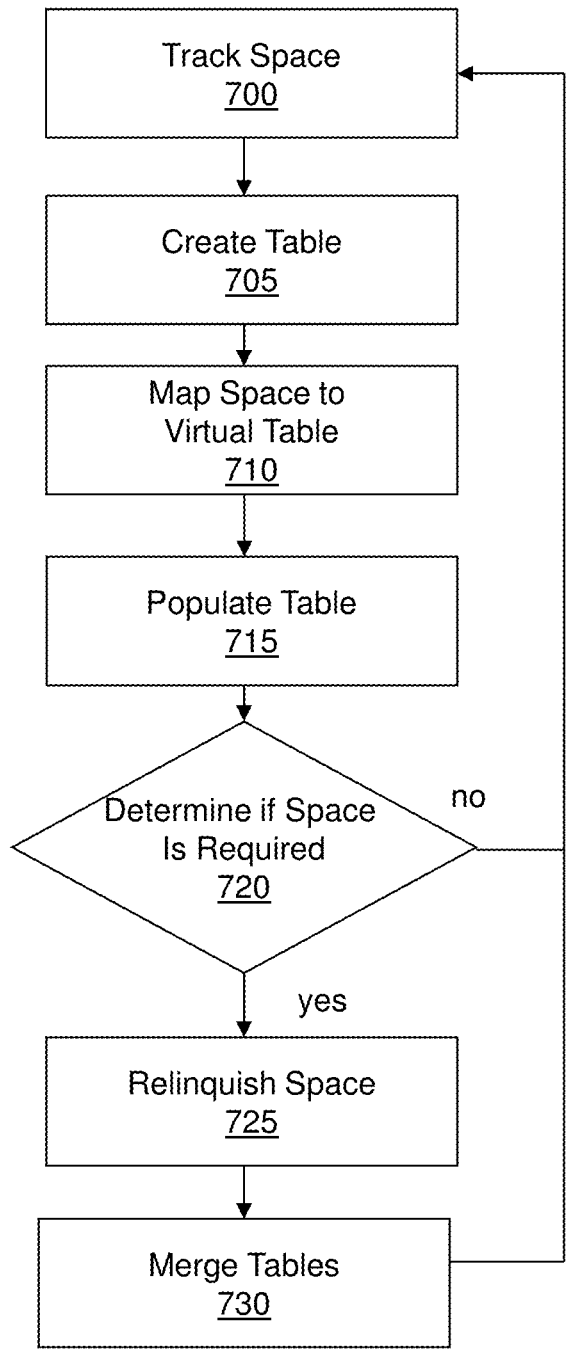
FIG. 7 depicts an exemplary flow diagram for using available space in one or more defined tables, in accordance with aspects of the present invention.
Figure 8:
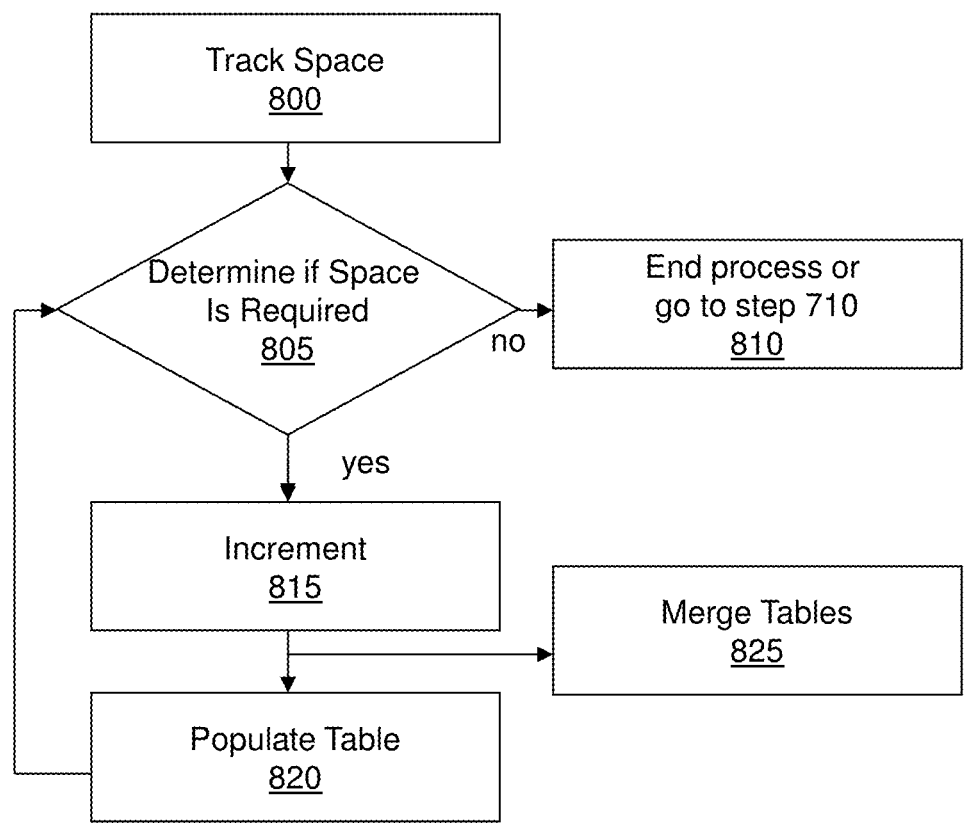
FIG. 8 shows an exemplary flow diagram of a dynamic grant process in accordance with aspects of the present invention.
Figure 9:
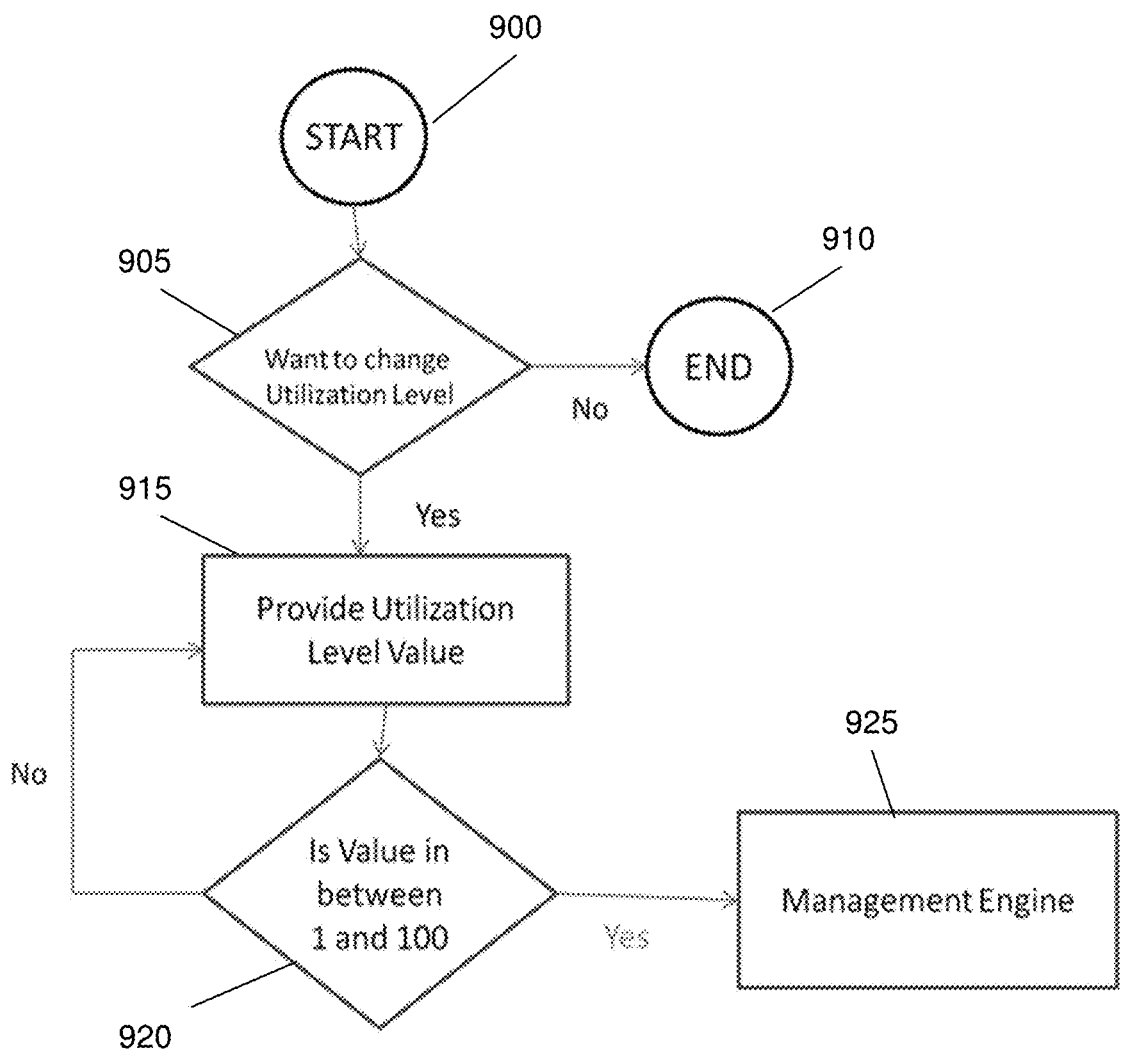
FIG. 9 shows an exemplary flow diagram for a process to fix a utilization level in accordance with aspects of the present invention.

FIGS. 7-9 shows an exemplary flow for performing aspects of the present invention. The steps of FIGS. 7-9 may be implemented in any of the environments of FIGS. 1-4, for example. The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIGS. 1-4. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 7 depicts an exemplary flow for using available space in one or more defined tables, in accordance with aspects of the present invention. At step 700, the processes of the present invention monitor or track the space within one or more defined fields of one or more tables having a definition schema. At step 705, the processes create a tracker table of all of the available spaces within the one or more tables. At step 710, the processes of the present invention determine which spaces are available (e.g., unused) within the fields of each of the tables and maps these available spaces to a virtual table. At step 715, the virtual table can be populated with records. At step 720, a determination is made as to whether any space is needed in the originally defined table(s). If so, at step 725, the processes of the present invention will relinquish the spaces from the virtual table, for use in the originally defined table(s). If the determination is negative at step 720, the process can revert to step 700. At optional step 730, the processes of the present invention can merge tables during off peak time per a schedule or when peak load is reduced. The processes can then revert to step 700.

FIG. 8 shows a flow diagram of a dynamic grant process in accordance with aspects of the present invention. At step 800, the processes of the present invention monitor or track the space within fields of one or more defined tables (which have a first provided value of space). At step 805, a determination is made as to whether additional space is required within the one or more tables. If not, the process will end at step 810. Alternatively, the processes can continue to step 710 of FIG. 7. If additional space is required in any of the fields of the one or more tables, at step 815, the processes will increment the values within the defined fields by a predetermined character length, e.g., provide an additional 25 characters. At step 820, the table can be populated with records within the available spaces. The steps of 805-820 can repeat. At optional step 825, the processes of the present invention can merge tables during off peak time per a schedule or when peak load is reduced.

FIG. 9 shows an exemplary flow diagram for a process to fix a utilization level in accordance with aspects of the present invention. More specifically, the process shown in FIG. 9 can be provided for a database administrator implementing the EOFM of the present invention, to fix the utilization level. In embodiments, the processes can be provided on a front-end of the EOFM component. At step 900, the process begins. At step 905, a decision is made as to whether the utilization is to be changed. If no changes, the process ends at step 910. If there is to be a change, at step 915, the processes of the present invention will provide a utilization level value. At step 920, a decision is made as to whether the utilization is within a predetermined set of values, e.g., 1 and 100. If so, the utilization level value would be passed on to the management engine, at step 925, where it knows about how much memory is being utilized, and how much memory is still un-used and can be utilized. In embodiments, the utilization level value would act as a parameter, depending on which management engine would try to re-use un-used memory. If the value is not between the predetermined set of values, the processes return to step 915.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology and provides or utilizes services. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method implemented in a computer infrastructure comprising hardware, the method comprising:
    monitoring available space within string fields having a predefined length within one or more tables having schema definitions;
    creating a virtual table with a size based on the available space;
    changing a utilization level of unused memory of the one or more tables through a graphical user interface (GUI) using a storage management engine;
    and mapping the unused memory of the one or more tables to the virtual table using the storage management engine based on the changed utilization level of the unused memory of the one or more tables,
    wherein the mapping the unused memory of the one or more tables to the virtual table is provided by the storage management engine which comprises an internal mapper which maintains information of unused spaces in an extent based format which comprises starting location and length;
    receiving a selection of space within the one or more tables through the GUI using the storage management engine;
    and preventing the selection of space within the one or more tables from being used in the virtual table;
    wherein the storage management engine creates variable length character fields for the one or more tables having the schema definitions.

2. The method of claim 1, further comprising creating a tracker table of all available space within the string fields having the predefined length of the one or more tables, and the tracker table is created by a subtractive method which determines that there is unused space available for reallocation from the one or more tables.

3. The method of claim 1, further comprising:
    mapping the available space in the string fields to the virtual table for populating the virtual table within one or more records having a space which corresponds with the available space in the string fields, wherein all spaces per the schema definitions are provided at a usage end by relinquishing any space that was mapped to the virtual table.

4. The method of claim 1, further comprising incrementing values of the one or more tables, when additional space is required for one or more fields of the one or more tables.

5. The method of claim 1, further comprising merging the one or more tables during off peak time per a schedule or when peak load is reduced.

6. The method of claim 1, further comprising creating variable length character fields for additional space required within the one or more tables.

7. The method of claim 1, further comprising displaying actual space and energy utilized against the period of time.

8. The method of claim 1, further comprising performing the steps of claim 1 in a cloud environment.

9. The method of claim 1, further comprising providing a percentage of the available space that is mapped to the virtual table, wherein the percentage of the available space is selected by a user.

10. The method of claim 1, further comprising a dynamic grant process which is configured to initially create a field with a minimum size within the one or more tables and then incrementing a size of the field until the size of the field reaches a maximum size.

11. The method of claim 1, wherein the utilization level is set by an administrator through the graphical user interface (GUI).

12. The method of claim 1, further comprising populating the virtual table with at least one record.

13. The method of claim 1, further comprising displaying an off peak time per a schedule through the graphical user interface (GUI).

14. The method of claim 13, further comprising displaying the unused memory and reserved memory of the one or more tables through the graphical user interface (GUI).

15. A system implemented in hardware and comprising a computer infrastructure operable to:
  create a tracker table of all available space within string fields having a predefined length of one or more tables;
  create a virtual table;
  and provide a percentage of the available space that is mapped to the virtual table through a graphical user interface (GUI) using a storage management engine,
  wherein the virtual table is created with a size that is based on the percentage of the available space that is mapped to the virtual table using the storage management engine,
  and the available space that is mapped to the virtual table is provided by the storage management engine which comprises an internal mapper which maintains information of unused spaces in an extent based format which comprises starting location and length;
  receiving a selection of space within the one or more tables through the GUI using the storage management engine;
  and preventing the selection of space within the one or more tables from being used in the virtual table;
  wherein the storage management engine creates variable length character fields for the one or more tables having the schema definitions.

* * * * *